Sept. 3, 1940.    W. L. DE BAUFRE    2,213,338
METHOD AND APPARATUS FOR FRACTIONATING GASEOUS MIXTURES
Filed Jan. 2, 1937

Wm. L. De Baufre, INVENTOR

Patented Sept. 3, 1940

2,213,338

UNITED STATES PATENT OFFICE 2,213,338

METHOD AND APPARATUS FOR FRACTIONATING GASEOUS MIXTURES

William Lane De Baufre, Lincoln, Nebr.

Application January 2, 1937, Serial No. 118,905

11 Claims. (Cl. 62—122)

This invention relates to the separation of gaseous mixtures and is particularly applicable where the gaseous mixture contains many constituents and is to be separated into two fractions, one of which is to contain the more volatile constituents while the other fraction is to contain the less volatile constituents in the original gaseous mixture.

By cooling such a gaseous mixture until partial liquefaction occurs and separating the liquefied fraction from the remaining gaseous fraction, the gaseous mixture is divided into two fractions. While the compositions of the two fractions will be different, the liquefied fraction will contain some of the more volatile constituents in the original gaseous mixture and the remaining gaseous fraction will contain some of the less volatile constituents. One object of the invention is to reduce the amount of the more volatile constituents in solution in the liquefied fraction. Another object of the invention is to recover less volatile constituents from the remaining gaseous fraction.

In such a process, the liquefied fraction should be re-evaporated and both fractions should be warmed within the separation unit nearly to the temperature of the entering gaseous mixture in order to reduce the refrigeration requirements of the process. Another object of the invention is to accomplish this re-evaporation and warming by heat exchange with the gaseous mixture cooled and partly liquefied so as to minimize the power requirements of the process for heat transfer.

Since such a process is conducted below atmospheric temperature, refrigeration must be supplied to balance heat leak into the separation unit and other thermodynamic losses. Another object of the invention is to provide such refrigeration and at the same time produce vapor and liquid refluxes necessary for purifying the liquid and vapor fractions of the gaseous mixture.

The gaseous mixture to be separated will generally be saturated with water vapor. Another object of the invention is to reduce the amount of water vapor carried into the separation unit with the gaseous mixture and to reduce the power requirements in the condensation of this water vapor.

Further objects of the invention include regulation of the process to maintain the desired purity and recover of products, regulation of the refrigeration cycle to reduce power requirements, etc.

Figure 1:
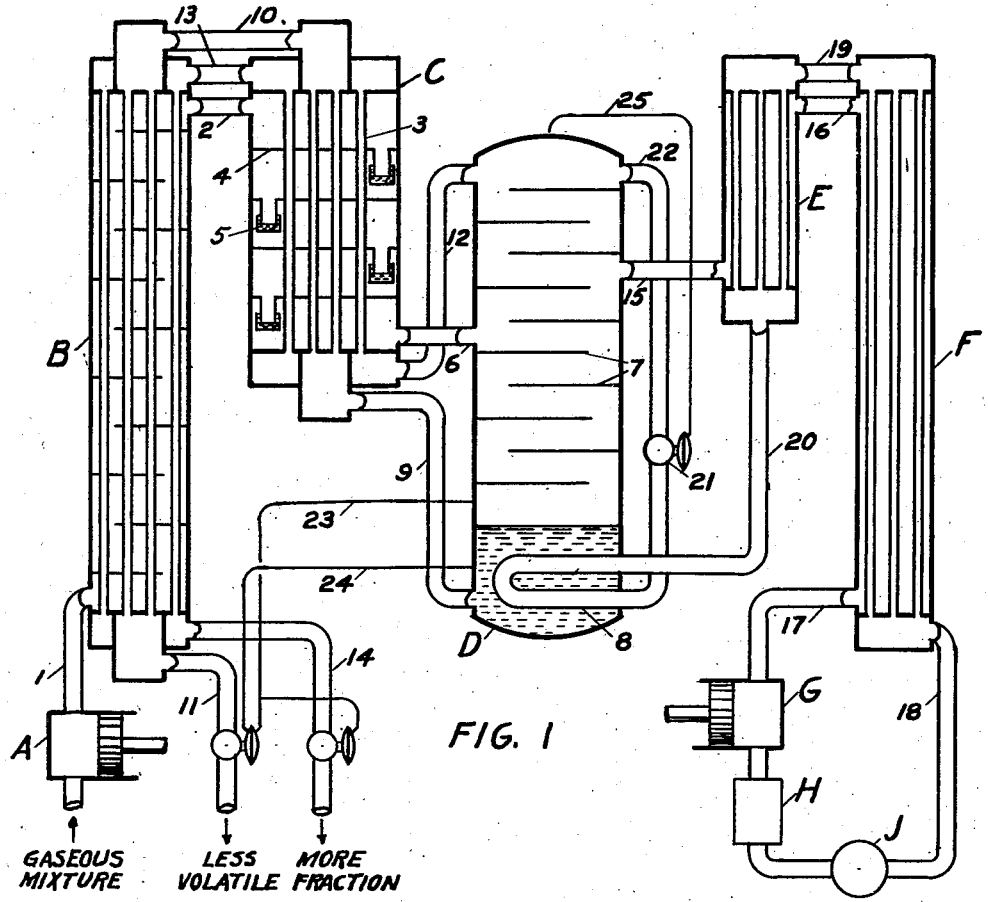
Figures 2, 3:
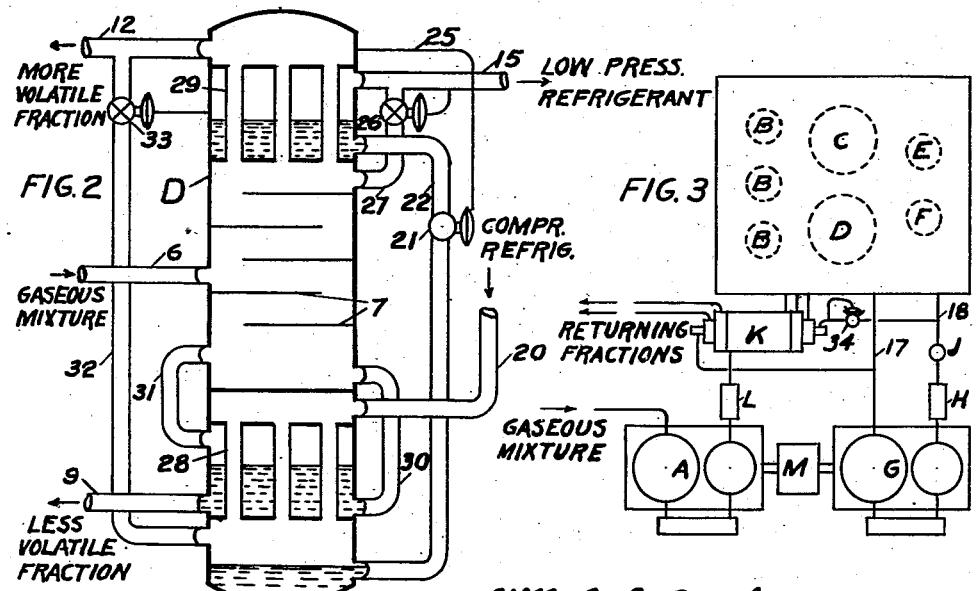

These objects and such other advantages as may hereinafter appear or are incident to the invention, are realized by the method and apparatus shown in preferred form on the accompanying drawing. Fig. 1 shows the general arrangement of the apparatus. Fig. 2 shows a modification in one piece of the equipment which is advantageous under certain circumstances. Fig. 3 shows the arrangement of the separation unit and compressors with auxiliary exchanger for condensation of water vapor.

The apparatus shown on the drawing comprises:

Compressor A for compressing the gaseous mixture to be fractionated.

Interchanger B for cooling the compressed gaseous mixture nearly to its liquefaction temperature by heat exchange with returning fractions separated therefrom.

Liquefier C for further cooling and partly liquefying the gaseous mixture by heat exchange with returning fractions, one of which is re-evaporated as well as warmed.

Scrubber D for separating the liquefied fraction of the gaseous mixture from the remaining gaseous fraction, for recovering less volatile constituents from the gaseous fraction, and for removing more volatile constituents from the liquefied fraction.

Exchangers E and F for warming a refrigerant extracted from the gaseous mixture by heat exchange with compressed refrigerant.

Compressor G with after-cooler H and purifiers J for compressing the refrigerant, removing the heat of compression and removing water vapor before recooling the compressed refrigerant.

Auxiliary exchanger K and after-cooler L for a preliminary cooling of the compressed gaseous mixture and condensing most of the water vapor therein.

Motor M for driving compressors A and G in synchronism.

The gaseous mixture to be fractionated may, for example, be a natural gas containing methane, ethane, propane, butane, etc., from which it is desired to recover as much of the ethane and heavier hydrocarbons as commercially feasable, nearly free from methane. Or, the gaseous mixture to be separated into two fractions may be obtained from an oil cracking still and contain hydrogen, methane, ethylene, ethane, propylene, propane, etc., from which it is desired to separate the hydrogen and methane. This gaseous mixture may be supplied under pressure or may be compressed by compressor A.

The compressed gaseous mixture may be chemically dried before entering interchanger B through pipe I; or, interchanger B may be provided in multiple, as indicated in Fig. 3, with cross-over pipes and valves for defrosting one interchanger while the other interchangers are cooling the gaseous mixture nearly to its temperature of liquefaction. This arrangement of interchangers is described and claimed in U. S. Patent 2,039,889, issued May 5, 1936, and in pending applications Serial No. 9,186 filed March 4, 1935, and Serial No. 44,616 filed October 11, 1935.

Whether the water vapor in the compressed gaseous mixture is removed chemically or by refrigeration, it is advantageous to compress the gaseous mixture to a moderately high pressure of 100 to 300 lb. gage or more in order to remove a large part of the water vapor by compression. Particularly where it is undesirable to compress the gaseous mixture to a moderately high pressure, preliminary exchanger K may be provided with auxiliary refrigeration as indicated in Fig. 2 in order to improve the heat transfer conditions of the process. Otherwise, the gaseous mixture cooled would require the extraction of a large amount of heat as compared with the heat necessary to warm the returning dry fractions. Aftercooler L is provided to remove the heat of compression of the gaseous mixture before it enters preliminary exchanger K and interchangers B.

The cooled gaseous mixture leaves interchanger B through pipe 2 and enters liquefier C wherein the gaseous mixture is further cooled and partly liquefied by contact with tubes 3. In order to approach phase equilibrium during liquefaction, the remaining gaseous portion is caused to bubble through the liquefied portion a number of times by means of baffles 4 and liquid seals 5 as the two portions flow downward through liquefier C. In addition to maintaining a minimum drop in temperature during partial liquefaction, this arrangement prevents liquid formed at one temperature dropping with little change in composition to a place of much lower temperature where it might solidify and clog the apparatus. The partly liquefied mixture leaves through pipe 6 and enters scrubber D at an intermediate point.

Within scrubber D, the liquefied fraction is separated from the remaining gaseous fraction. The liquefied fraction flows down over trays 7 and eventually accumulates around coil 8 where it is partly vaporized. While flowing down over trays 7, the liquefied fraction is subjected to the scrubbing action of the vaporized liquid as a reflux gas. This scrubbing action removes more volatile constituents, such as hydrogen and methane, from the liquefied fraction composed of less volatile constituents, such as ethylene, ethane and heavier hydrocarbons in the original gaseous mixture.

The remaining less volatile constituents return as a liquid through pipe 9 to liquefier C where the liquid is vaporized in flowing up through the central group of tubes 3. As the liquid is partly vaporized, the remaining liquid is caused to move along with the vaporized part by maintaining the velocity within tubes 3 above the critical velocity below which liquid is not carried along with vapor. This condition of operation is aided by means of whirler strips or other construction within the group of tubes through which the liquefied fraction of the original gaseous mixture flows.

The vaporized liquid fraction returns through pipe 10 from liquefier C to interchanger B where it is further warmed nearly to the temperature of the original gaseous mixture entering through pipe 1. The vaporized less volatile fraction of the original gaseous mixture then leaves through pipe 11 as one of the products of the process.

Within scrubber D, less volatile constituents, such as ethylene, ethane and heavier hydrocarbons, are recovered from the remaining gaseous fraction separated from the liquefied fraction of the gaseous mixture. This is accomplished by subjecting the gaseous fraction to the scrubbing action of a reflux liquid in trays 7 above inlet pipe 6. This reflux liquid is obtained by liquefying part of the gaseous fraction as explained below.

The purified gaseous fraction flows through pipe 12 from scrubber D to liquefier C where it is warmed in flowing up through the outer group of tubes 3 by heat exchange with the gaseous mixture being liquefied. The purified gaseous fraction then returns from liquefier C to interchanger B through pipe 13. Within interchanger B, the purified gaseous fraction is further warmed nearly to the temperature of the original gaseous mixture entering through pipe 1. The purified gaseous fraction leaves through pipe 14 as one of the products of the process.

In order to produce the gas and liquid refluxes required for purification of the liquid and gaseous fractions as explained, and in order to supply the refrigeration necessary for the process, a portion of the gaseous fraction is withdrawn from scrubber D through pipe 15. The point of withdrawal is intermediate to inlet pipe 6 and outlet pipe 12.

The gaseous mixture withdrawn, in flowing through exchanger E, pipe 16 and exchanger F, is warmed to approximately room temperature by the time it reaches pipe 17. The gaseous mixture withdrawn is then compressed by compressor G, cooled in after-cooler H and purified of water vapor in purifier J. It then returns through pipe 18, exchanger F, pipe 19 and exchanger E where it is recooled and partly liquefied by heat exchange with the gaseous mixture withdrawn through pipe 15.

The compressed and partly liquefied gaseous mixture then flows through pipe 20 to coil 8 where it is further liquefied and cooled by heat exchange in vaporizing a portion of the liquid surrounding coil 8. This heat exchange is possible by reason of the high pressure of the gaseous mixture within coil 8 as compared with the pressure within scrubber D.

The high pressure mixture of gas and liquid is throttled through valve 21. Although part of the liquefied gas may be re-evaporated by throttling, some liquid remains. This liquid is separated from the remaining gas when the mixture is discharged through pipe 22 into the top of scrubber D. This separated liquid is the reflux liquid which scrubs the gaseous fraction of the original gaseous mixture as this fraction bubbles up through trays 7 above inlet pipe 6. The gas separated from the liquid entering through pipe 22 commingles with the gas rising through trays 7, and the commingled gases leave through pipe 12.

The gaseous mixture for refrigeration and reflux production, is withdrawn from a point below the top of scrubber D because it is further purified of less volatile constituents in partly liquefying it. The trays between the points of withdrawal and return serve to bring the gaseous mixture bubbling through these trays to nearly the same state of purity before commingling this gaseous mixture with the unliquefied part of the gaseous mixture returned through pipe 22.

In a process of fractionating a gaseous mixture as explained, the recovery and purity of each fraction is maintained nearly constant by maintaining certain conditions of operation constant. The conditions selected to be maintained constant are the temperature of the gaseous fraction leaving the top of scrubber D and the pressure within scrubber D. At a given pressure, the temperature of a gaseous mixture consisting mainly of hydrogen and methane, will vary considerably with the amount of less volatile gases, ethylene, ethane and heavier hydrocarbons, mixed therewith. Therefore, by maintaining a nearly constant temperature at the top of scrubber D, the proportion of less volatile gases mixed with the more volatile fraction leaving through pipe 12, will be maintained nearly constant. With the original gaseous mixture of nearly constant composition, the less volatile fraction liquefied will also be maintained of nearly constant purity by the same means.

For automatic regulation, tubes 23 and 24 are connected respectively above and below the level of the liquefied fraction within scrubber D. Variations in differential pressure due to variations in liquid level will then cause the valve in pipe 11 to discharge the liquid as fast as it accumulates in scrubber D, thereby maintaining a nearly constant liquid level. Tube 23 is also connected to the control chamber of the valve in pipe 14, thereby maintaining a nearly constant pressure in scrubber C. In some cases, it would be preferable to connect the control chamber of this valve to the top rather than to the bottom of scrubber D in order to maintain a more nearly constant pressure at the top of scrubber D.

The control chamber of valve 21 is connected to the top of scrubber C or to outlet pipe 12 by a distant type thermometer 25. This device is arranged to close valve 21 somewhat if the temperature rises and to open valve 21 somewhat if the temperature falls. By a proper type of control, the temperature is thereby maintained substantially constant. Valve 21 should be closed somewhat when the temperature rises in order to raise the compression pressure of the refrigerant and thereby increase the refrigeration supplied in order to lower the temperature again to the desired value. Valve 21 should be opened somewhat when the temperature falls in order to lower the compression pressure and thereby decrease the refrigeration supplied. But as the immediate effect of any change in valve 21 is the reverse of the eventual effect, this temperature control should have delayed action in order to produce equilibrium eventually without excessive fluctuations due to temporary effects.

Compressor A is of the positive displacement type and acts as a metering device to supply the gaseous mixture at a substantially constant rate of mass flow with a substantially constant pressure of supplying the gaseous mixture to compressor A. This metering device may be used even when no increase in pressure of the gaseous mixture is desired. Compressor A may be operated in synchronism with compressor G by driving both compressors with the same motor M as shown in Fig. 3.

With preliminary exchanger K in Fig. 3, additional refrigeration is supplied to augment the heat absorbed by the returning fractions within the temperature range in which most of the water vapor in the compressed gaseous mixture is condensed. This additional refrigeration is provided by withdrawing a part of the compressed refrigerant from pipe 18, expanding this part through throttle valve 34 whereby its temperature is reduced approximately to that at which the returning fractions enter exchanger K, and then passing the expanded part through exchanger K. After being warmed in exchanger K, the expanded part is returned to pipe 17 where it is commingled with the refrigerant before compression. Instead of keeping the expanded part separate from the returning fractions, it might be commingled with one of them and not returned to pipe 17.

As the pressure in pipe 18 varies in adjusting the refrigeration supplied to the process to balance heat leak and other thermodynamic losses, the refrigeration to compensate for the cooling necessary to condense water vapor will tend to vary. With the same setting of throttle valve 34, the rate of flow will decrease in initial pressure. An automatic control can readily be applied to maintain the rate of flow constant. But it is desirable to add another control factor based on the initial pressure so that the rate of flow will increase as the initial pressure decreases. By so doing, loss in refrigeration due to a lower initial pressure is more or less compensated by gain in refrigeration due to a higher rate of flow.

In the scrubber of Fig. 2, the liquid reflux for removing less volatile constituents from the gaseous fraction of the gaseous mixture, is also obtained by partial liquefaction of the gaseous fraction, but in a somewhat different manner. Also, the refrigerant is obtained by withdrawing a portion of the gaseous fraction. This portion is warmed to atmospheric temperature, compressed and recooled to be utilized for producing vapor reflux within scrubber D.

At starting the plant, compressor G tends to reduce the refrigerant pressure in pipe 15. Valve 26 operated in accordance with the pressure in pipe 15, automatically opens to permit some of the gaseous mixture to enter pipe 15 from scrubber D through pipe 27. The compressed and recooled refrigerant returning through pipe 20, is partly condensed within tubes 28. The resulting mixture of liquid and vapor is throttled through valve 21 into the space surrounding tubes 29. Here the liquefied refrigerant is evaporated by heat transfer from the gaseous fraction of the gaseous mixture within tubes 29. The portion liquefied flows down to trays 7 to serve as the liquid reflux in recovering less volatile constituents from the gaseous fraction. The remaining gaseous portion leaves through pipe 12. Vapor reflux for removing more volatile constituents from the liquefied fraction, is produced by heat transfer through tubes 28 to the liquefied fraction flowing down through pipe 30. The resulting vapor rises through pipe 31 to form the vapor reflux within scrubber D.

Pipe 32 with automatic valve 33 is provided to discharge vapor only, remaining after partial liquefaction of the refrigerant within tubes 28. This vapor is discharged into pipe 12 to commingle with the gaseous fraction of the original gaseous mixture. The vapor remaining after partial liquefaction will be richer in the more volatile constituents than the refrigerant withdrawn from scrubber D through pipe 27. By discharging some of this remaining vapor through pipe 32 and replacing it by the equivalent amount of refrigerant withdrawn through pipe 27, the composition of the refrigerant is gradually changed to contain less of the more highly volatile constituents and more of less highly volatile constituents in the refrigerant withdrawn.

The recycling refrigerant will thus become richer in the constituents of intermediate volatility in the original gaseous mixture. This is evidently so since the refrigerant is withdrawn from a point where the least volatile constituents have been largely removed from the gaseous fraction of the original gaseous mixture. By removing constituents of highest volatility from the refrigerant, the refrigerant becomes a less perfect gas. The same refrigeration is then obtained by throttling from a lower compression pressure. Less power is therefore required to operate the process.

Also, the refluxes for purification within scrubber D are increased because the constituents remaining in the refrigerant are more readily liquefied within tubes 28 than the constituents removed from the refrigerant. More liquid is therefore available for re-evaporation around tubes 29. With the automatic controls set for a given purity of product, a further reduction in power for compressing the refrigerant is thus effected.

For the same power for refrigeration, the purities of the products may be increased by adjusting the automatic controls. The increase in purities is then due to larger refluxes of liquid and vapor and to a lower operating temperature.

Valves 26 and 33 may be automatically operated to maintain the proper amount of refrigerant in the refrigeration cycle. Thus, if valve 26 is arranged to admit refrigerant through pipe 27 whenever the pressure in pipe 15 falls below a minimum value and valve 33 is arranged to discharge refrigerant through pipe 32 whenever the pressure rises above a maximum value, the amount of refrigerant in the refrigerant cycle will be maintained within corresponding limits depending upon the pressure of compression as determined automatically by valve 21 arranged to maintain a substantially constant temperature at the top of scrubber D. Whenever the compression pressure varies, an excessive variation in the low pressure of the refrigerant is automatically prevented by the same means.

In starting operation with either arrangement, the unit is first filled with the gaseous mixture to be processed. Compressor G is then started, more gaseous mixture being admitted to the apparatus to keep the pressure about atmospheric as the density of the compressed gas is increased. With the compressor arrangement in Fig. 3, a clutch may be provided between motor M and compressor A to disconnect the latter at starting. In throttling the compressed gas through valve 21, the temperature drops in accordance with the thermal properties of the gaseous mixture until partial liquefaction eventually occurs. The liquefied gas fills the trays in scrubber D and then accumulates around coil 8 or tubes 28, fresh gaseous mixture being admitted to keep the pressure at or above atmospheric pressure. Flow of gaseous mixture through interchanger B, liquefier C and scrubber D may then be gradually started. In fact, it may be desirable to start the gas flow before liquids are fully built up in order to supply less volatile constituents for liquefaction and to discharge more volatile constituents from the apparatus.

After liquid is accumulated to the desired level in the bottom of scrubber D, normal operation is quickly attained with the gaseous mixture to be processed supplied at the desired rate of mass flow. During normal operation, conditions are automatically maintained as previously described in order to secure the recovery and purity of products attainable with the proportions of the apparatus used. Without automatic devices, manual control may be used to maintain a constant liquid level within scrubber D by regulating the valve in pipe 11, a constant pressure in scrubber D (preferably at the top) by regulating the valve in pipe 14, and a constant temperature at the top of scrubber D by regulating valve 21.

A constant temperature of the liquid in the bottom of the scrubber might be maintained, but this temperature would not change as rapidly with changing conditions as the temperature at the top of the scrubber.

For the scrubber shown in Fig. 2, regulation of admission and discharge of refrigerant from the refrigerating cycle will occur automatically but may be produced manually to secure the desired performance of the apparatus. It may also be necessary to discharge some liquid from the refrigerating cycle at times through a drain not shown.

I claim:

1. Method of separating a gaseous mixture into fractions which includes cooling the gaseous mixture until a fraction thereof is liquefied, separating the liquefied fraction from the remaining gaseous fraction, withdrawing a portion of the remaining gaseous fraction, compressing said portion, bringing the compressed portion into heat exchange with the liquefied fraction whereby vapor reflux is produced for removing more volatile constituents from the liquefied fraction and part of the compressed portion is liquefied, throttling the partly liquefied compressed portion to the pressure of the remaining gaseous portion, subjecting beyond the point of withdrawal the remaining gaseous portion not withdrawn to the liquefied part of the portion withdrawn as a liquid reflux, and subsequently commingling the remaining gaseous portion not withdrawn with the vapor part of the portion withdrawn.

2. Method of separating a gaseous mixture wherein a refrigerant passes and repasses through a cycle of compression, partial liquefaction, expansion and vaporization, which includes discharging from the cycle a part only of the gaseous portion of the compressed and partly liquefied refrigerant and replacing it by a part of the gaseous mixture being separated whereby more volatile constituents in the refrigerant are replaced by less volatile constituents in the gaseous mixture being separated.

3. Method of separating a moist gaseous mixture into dry gas fractions which includes cooling the moist gaseous mixture whereby water vapor therein is condensed, further cooling the gaseous mixture until a fraction thereof is liquefied, separating the liquefied fraction from the remaining gaseous fraction, withdrawing a portion of the remaining gaseous fraction, warming said portion to room temperature, compressing said portion, removing the heat of compression, expanding a part of said portion whereby said part is cooled, utilizing the cooled part to supply refrigeration to the gaseous mixture at the temperature at which water vapor is condensed, cooling the remainder of said portion after separating said part and utilizing the cooled remainder to supply refrigeration at low temperature to balance heat leak and other thermodynamic losses.

4. Method of separating a moist gaseous mixture into dry fractions as in claim 3 wherein the rate of mass flow of said part is increased as the compression pressure of said portion is decreased in order to compensate for loss of refrigeration by throttling from a lower initial pressure.

5. Apparatus for separating a gaseous mixture into fractions including a compressor for compressing said gaseous mixture above atmospheric pressure, an interchanger for cooling the compressed gaseous mixture by heat exchange in warming returning fractions, a liquefier for further cooling and partly liquefying the compressed gaseous mixture by heat exchange in warming returning fractions and vaporizing one of them, a scrubber for separating the liquefied fraction of the gaseous mixture from the remaining gaseous fraction and for subjecting both fractions to vapor and liquid refluxes produced by vaporizing the liquefied fraction and condensing the remaining gaseous fraction respectively, means for returning the liquefied fraction and remaining gaseous fraction from said scrubber to said liquefier and said interchanger and means for supplying refrigeration to balance heat leak into the apparatus and other thermodynamic losses.

6. Apparatus for separating a gaseous mixture into fractions as in claim 5 wherein the means for supplying refrigeration includes means for withdrawing a portion of the remaining gaseous fraction, an exchanger for warming the portion withdrawn to atmospheric temperature, a compressor for compressing said portion, means for returning the compressed portion through said exchanger whereby the compressed portion is cooled, means for expanding the cooled compressed portion, and means for commingling the expanded portion with the remaining gaseous fraction.

7. In apparatus for separating a gaseous mixture into fractions, a scrubber, means for cooling and partly liquefying the gaseous mixture and for introducing it into said scrubber at an intermediate point, means for withdrawing the liquefied fraction from the bottom of said scrubber, means for withdrawing one portion of the remaining gaseous fraction from the top of said scrubber, means for withdrawing another portion of the remaining gaseous fraction from a point between the inlet and the top of said scrubber, means for compressing, cooling and expanding said other portion whereby a part is liquefied and means for introducing the partly liquefied portion into the top of said scrubber, whereby the portion of the remaining gaseous fraction not withdrawn is subjected to the liquefied part of the portion withdrawn as a reflux liquid before being commingled with the unliquefied part of the portion withdrawn.

8. In apparatus for separating a gaseous mixture into fractions, a scrubber, means for cooling and partly liquefying the gaseous mixture and for introducing it into said scrubber at an intermediate point, a vaporizer wherein the liquefied fraction of the gaseous mixture accumulates, a condenser through which the remaining gaseous fraction of the gaseous mixture flows, means for cycling a refrigerant from said condenser to said vaporizer and back again including a compressor for compressing the refrigerant before entering said vaporizer and a valve for throttling the refrigerant before entering said condenser, whereby part of the liquefied fraction is vaporized to produce reflux vapor in said scrubber and part of the remaining gaseous fraction is liquefied to produce reflux liquid in said scrubber, means for withdrawing the unvaporized liquid fraction from said vaporized and means for withdrawing unliquefied remaining gaseous fraction from said condenser.

9. In apparatus for separating a gaseous mixture into fractions, a scrubber, means for cooling and partly liquefying the gaseous mixture and for introducing it into said scrubber at an intermediate point, a vaporizer wherein the liquefied fraction accumulates, means for discharging the liquefied fraction from said vaporizer, means for regulating the rate of discharge in accordance with the liquid level within said vaporizer whereby the liquefied fraction is discharged as rapidly as it accumulates, means for discharging the remaining gaseous fraction from the top of said scrubber, means for regulating the rate of discharge in accordance with the pressure in said scrubber whereby the pressure in said scrubber is maintained substantially constant, means for supplying refrigeration to balance heat leak and other thermodynamic losses, and means for regulating the rate of supply of refrigeration in accordance with the temperature of the remaining gaseous fraction withdrawn, whereby the temperature of the remaining gaseous fraction withdrawn is maintained substantially constant and with a constant composition of the gaseous mixture supplied, the purity of the remaining gaseous fraction withdrawn is maintained substantially constant.

10. Apparatus for separating a gaseous mixture into fractions including means for cooling and partly liquefying the gaseous mixture, a scrubber wherein the liquefied fraction is separated from the remaining gaseous fraction, a vaporizer wherein the liquefied fraction is brought into heat exchange with a portion of the remaining gaseous fraction, means for withdrawing, compressing and introducing said portion into said vaporizer whereby the compressed portion is partly liquefied in vaporizing a part of the liquefied fraction to produce vapor reflux in said scrubber, a condenser wherein the portion of the remaining gaseous fraction not withdrawn is brought into heat exchange with a part of the partly liquefied portion, and means for throttling said part of the partly liquefied portion into said condenser whereby the partly liquefied portion is vaporized in condensing the remaining gaseous fraction to produce liquid reflux in said scrubber.

11. Method of separating a gaseous mixture into fractions which includes cooling the gaseous mixture until a fraction thereof is liquefied, separating the liquefied fraction from the remaining gaseous fraction, subjecting the liquefied fraction to a vapor reflux produced by partly vaporizing said liquefied fraction whereby more volatile constituents are removed from the liquefied fraction, subjecting the remaining gaseous fraction to a liquid reflux produced by partly liquefying said remaining gaseous fraction whereby less volatile constituents are removed from the remaining gaseous fraction, and subsequently returning the liquefied fraction and the remaining gaseous fraction in heat exchange with the gaseous mixture before separation, the liquefied fraction being vaporized and both fractions being warmed in cooling the gaseous mixture and partly liquefying a fraction thereof, wherein in vaporizing the liquified fractions the liquid remaining unvaporized is caused to move along with the vaporized portion until all liquid is vaporized, and in liquefying a fraction of the gaseous mixture the gaseous portion remaining unliquefied is repeatedly bubbled through the liquefied portion as liquefaction proceeds, whereby phase equilibrium is approached in both liquefaction of the gaseous mixture and vaporization of the liquefied fraction and heat transfer is improved between the gaseous mixture and both fractions.

WILLIAM LANE DE BAUFRE.